March 17, 1964    J. F. ANETSBERGER ETAL    3,124,990
DOUGH CUTTER MECHANISM WITH STRIPPER MEANS
Filed July 10, 1957            2 Sheets-Sheet 1
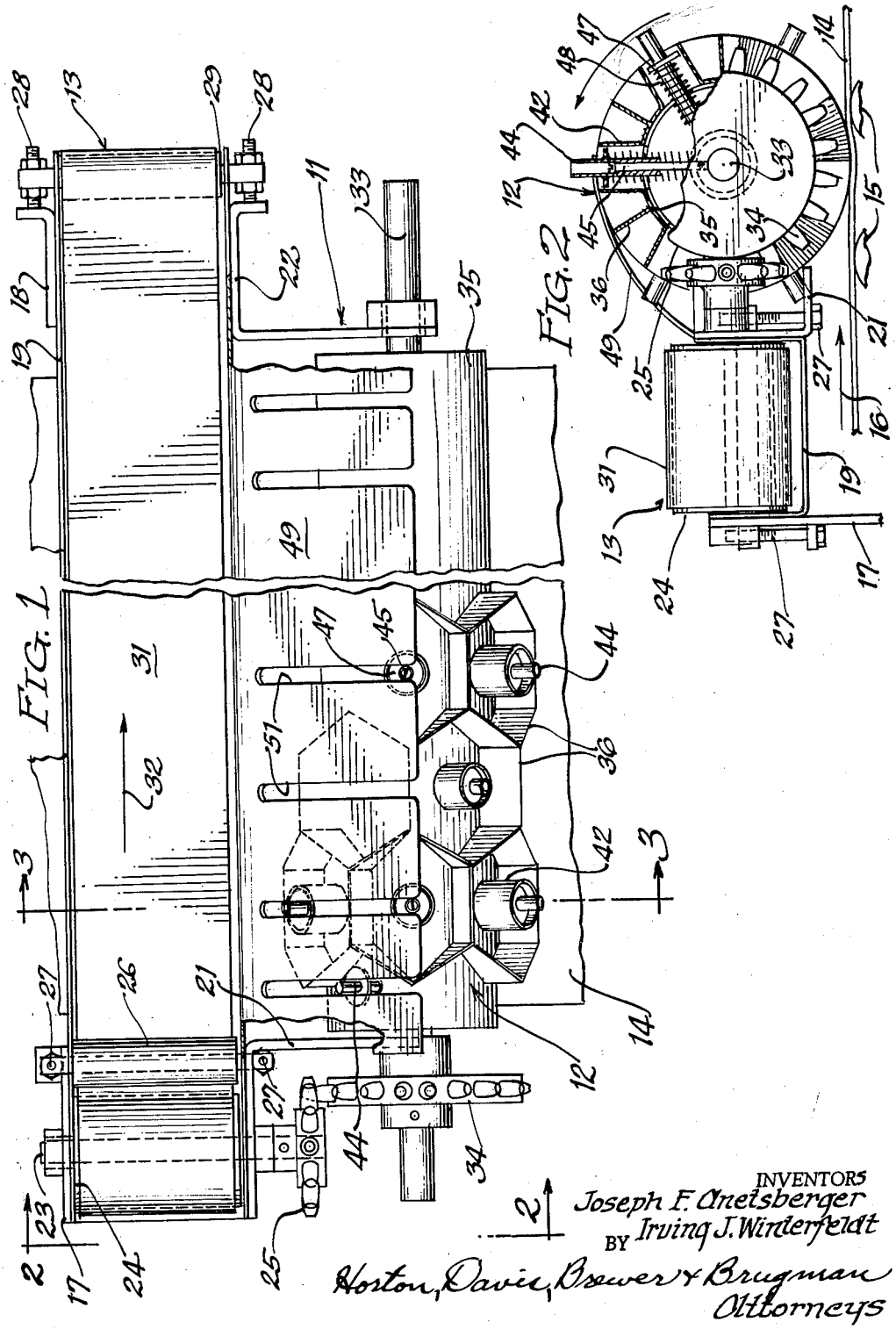
INVENTORS
Joseph F. Anetsberger
Irving J. Winterfeldt
BY
Horton, Davis, Brewer & Brugman
Attorneys

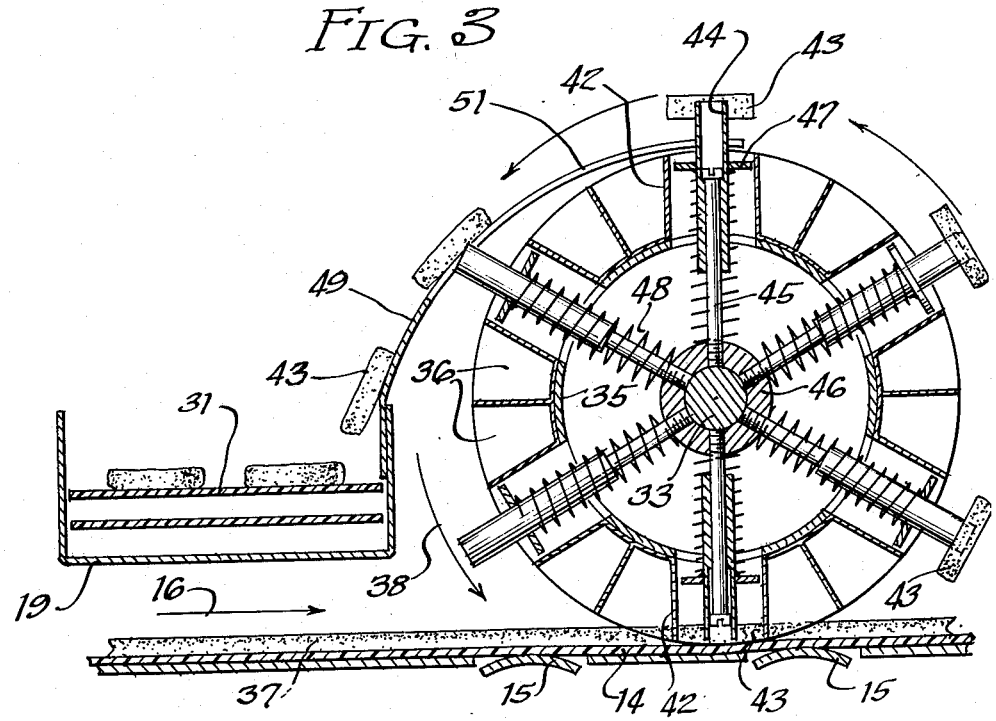
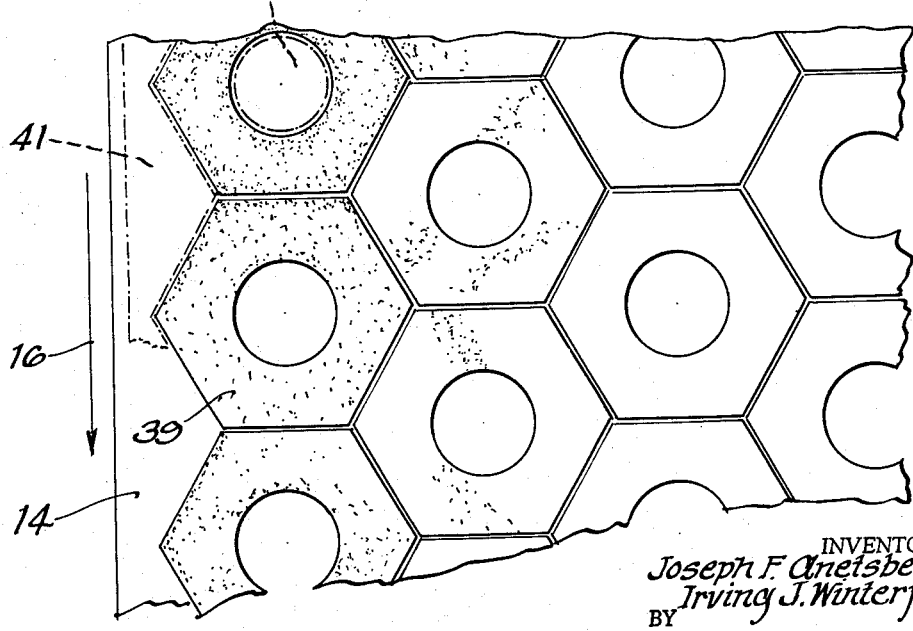

United States Patent Office 3,124,990
Patented Mar. 17, 1964

3,124,990
DOUGH CUTTER MECHANISM WITH
STRIPPER MEANS
Joseph F. Anetsberger, Northbrook, Ill., and Irving J. Winterfeldt, Appleton, Wis., assignors to Anetsberger Brothers, Inc., Northbrook, Ill., a corporation of Illinois
Filed July 10, 1957, Ser. No. 671,069
16 Claims. (Cl. 83—117)

This invention relates in general to dough cutters and more particularly to mechanism for forming dough pieces from a sheet of dough.

A principal object of the invention is to minimize the amount of scrap resulting from cutting dough pieces from a sheet of dough and to automatically remove such scrap as an incident of the cutting.

In the specific embodiment of the invention herein illustrated, cutter means are provided for rotation about a horizontal axis and with a plurality of peripheral cutter members normal to the axis and joining each other at adjacent ends to define angles of 120 degrees, with some outlining the active lateral edges of the cutter means and the remainder each forming adjacent sides of each of two hexagonal outlines, whereby a plurality of hexagonal dough pieces and only two marginal scrap strips are cut from a dough sheet, together with a hollow cylindrical cutter member having its axis normal to the horizontal axis of rotation and centrally disposed with respect to each of the hexagonal outlines to cut a cylindrical center scrap piece from each hexagonal dough piece to complete the formation of doughnut blanks with a minimum amount of scrap. This embodiment also includes, as means for automatically removing such scrap from the cut dough sheet, a tubular picker mounted centrally of each such cylindrical cutter for rotation with the cutter means and translational movement normal to the axis of rotation relative to the cutter members for picking up the center scrap pieces, with additional similar pickers disposed adjacent the lateral edges of the cutter means to pick up the marginal scrap strips, springs for moving the pickers to carry the scrap pieces thereon to an outwardly spaced position relative to the cutter members, and stationary stripper means having fingers with free ends extending between the cutter members and the scrap pieces when the latter are in such outwardly spaced position and adjacent the pickers for cooperating with the latter to remove the scrap dough pieces therefrom.

Another important object of the invention is to facilitate handling of the scrap dough removed from a dough sheet as an incident of cutting the sheet, and in the present embodiment this is accomplished by an auxiliary conveyor that is driven by the cutter means.

A further object of the invention is to provide cutter mechanism for the above-described purposes which conveniently may be mounted upon any standard makeup table having an endless belt conveyor, with the cutter means preferably being rotated by the belt conveyor.

Numerous other objects and advantages of the invention will be apparent as it is better understood from the following description, which, when taken in connection with the accompanying drawings, discloses a preferred embodiment thereof.

In the drawings:

FIGURE 1 is a top plan view of dough cutter mechanism embodying the features of this invention;

FIG. 2 is an elevational view as seen from the line 2—2 of FIG. 1, with parts of the cutter means shown in section;

FIG. 3 is a vertical section taken substantially on the line 3—3 of FIG. 1; and

FIG. 4 is a top plan view of a part of the main conveyor showing the arrangement of the hexagonally shaped dough pieces thereon after the same are formed by the cutter means of the preceding figures.

Referring more particularly to FIG. 1 of the drawings, reference numeral 11 indicates in general a dough cutter mechanism embodying the features of the invention which comprises rotary cutter means designated generally by reference numeral 12 and an auxiliary conveyor 13 secured together as a unit and adapted to be mounted upon, or in operative association with, any standard makeup table having a main endless belt conveyor with an upper horizontal run 14. As best seen in FIGS. 2 and 3, the makeup table preferably includes a transversely recessed portion defined by a pair of parallel and transversely extending members 15 over which the upper run 14 of the main belt conveyor moves and is driven in well-known manner by any suitable means in the direction of the arrows 16.

The embodiment of the dough cutter mechanism 11 herein illustrated is supported in cooperative relationship to the main conveyor 14 by a standard 17 (FIG. 2) and a companion standard 18 at the other end of the auxiliary conveyor 13 (FIG. 1) which may be secured in any desired manner to the frame of the main belt conveyor or mounted upon the floor or other structure supporting the latter. Interconnected between the support standards 17 and 18 is a channel-like trough 19 to the rear (right in FIG. 2) vertical wall of which are secured angle brackets 21 and 22 disposed opposite the support standards 17 and 18, respectively. Suitably journalled by the support standard 17 and the angle bracket 21 is a longitudinally extending and horizontally disposed shaft 23 (FIG. 1) upon which is secured a drive pulley 24 that is disposed between the members 17 and 21 and a pin wheel gear 25 that is located forwardly of the angle bracket 21. Inwardly of the drive pulley 24 (to the right in FIG. 1) is a tension roller 26 disposed parallel thereto and having a shaft which rotatably supports the same and is mounted at its ends in well-known manner on the support standard 17 and angle bracket 21 for vertical adjustment relative thereto by means of adjustable belt tensioning bolts 27. Similarly mounted on the outer ends of the support standard 18 and the angle bracket 22 (FIG. 1), as by means of adjustable belt tensioning bolts 28, is another tensioning roller 29. These members 19–29 comprise the auxiliary conveyor 13, together with an endless belt 31, the lower run of which extends between the drive pulley 24 and the tensioning roller 29, and the upper run of which extends from the drive pulley 24 under the tension roller 26 to the roller 29. This upper run of the endless belt 31 is driven in the direction of arrow 32 (FIG. 1) by the pulley 24 and may be suitably tensioned by adjustment of the bolts 27 and 28.

Each of the angle brackets 21 and 22 has a rearwardly extending arm (FIG. 1) for suitably journalling a shaft 33 which extends transversely across the main belt conveyor 14 and forms a part of, and supports, the rotary cutter means 12. Outwardly of the angle bracket 21, this shaft 33 has secured thereto in any suitable manner a driving pin wheel 34 which meshes with the pin wheel 25 for rotating the same to drive the belt 31 of the auxiliary conveyor 13. Pin wheels are employed for this gearing 34, 25 rather than conventional beveled gears because such pin wheels will not be clogged by the ambient flour and moisture attendant with the normal conditions under which the dough cutter mechanism operates.

A drum 35 (FIG. 1) is rigidly secured in any suitable manner to the shaft 33 between the brackets 21 and 22. This drum 35 carries a plurality of cutter members or elements 36 secured to the periphery thereof in any desired manner and extending outwardly at right angles or normal to the axis of rotation of the shaft 33. The cutter members 36 are angularly disposed relative to each other in the manner best illustrated in FIG. 1 to provide a plurality of adjacently disposed and hexagonally shaped cutters, with each cutter member 36 joining another such cutter member at each end thereof to define therewith an included angle of 120 degrees. The marginal cutter members 36 define the lateral edges of the cutter means 12, while each of the remaining cutter members 36 is adapted to form the adjacent sides of each of two of the hexagonal outlines. Consequently, when a sheet of dough, as indicated at 37 in FIG. 3, is carried under and past the rotary cutter means 12 by the upper run 14 of the main belt conveyor in the direction of the arrows 16 of FIGS. 3 and 4, and the cutter means is rotated in the direction of arrows 38, the members 36 successively cut through the dough sheet 37 to form a plurality of hexagonally shaped dough pieces 39 (FIG. 4), without any waste, scrap or selvage therebetween, and only two marginal scrap strips, a portion of one of which is illustrated in FIG. 4 at 41.

Similarly mounted on the periphery of the drum 35 and centrally disposed with relation to each of the previously mentioned hexagonal outlines formed by the cutter members 36 is a hollow cylindrical cutter member 42 having its axis normal to the horizontal axis of rotation of the shaft 33. Each of these peripherally disposed cutter members 42 thus is adapted to cut through the dough sheet 37 to form a cylindrical center scrap piece 43, as illustrated in broken lines in the upper left-hand corner of FIG. 4, which defines the center hole of the associated doughnut blank or dough piece 39. It thus will be seen that the doughnut blanks 39 are formed from the dough sheet 37 by the rotary cutter means 12 with an absolute minimum amount of scrap. As is best shown in FIG. 3, the requisite rotation of the cutter means 12 is accomplished by driving engagement between the peripheral edges of the cutter members 36 and 42 with the upper surface of the upper run 14 of the belt of the main conveyor. It is for this reason that it is preferred to provide the transversely extending recess in the upper surface of the makeup table supporting the belt conveyor 14, as defined by the transverse members 15, so that the supporting standards 17 and 18 may be so secured to the makeup table frame or mounted on its supporting surface as to dispose the lowest part of the periphery of the rotary cutter means 12 slightly below the normal upper horizontal surface of the upper run 14 of the main belt conveyor. The rotary cutter means 12 thus depresses the belt 14 slightly between the transverse members 15 to effect greater than mere tangential line contact of the cutter means with the upper surface of the belt. It also will be appreciated that the outer or peripheral edges of the several cutter members 36 and 42 are so shaped as together to define a cylindrical surface concentric with the drum 35.

Means are provided for picking up and removing from the conveyor 14 the marginal scrap strips 41 and the center scrap pieces 43, which means comprises a plurality of pickers of similar construction, one of which is mounted centrally of each of the hollow cylindrical cutter members 42 and others of which (FIG. 1) are disposed adjacent the lateral edges of the cutter means to pick up the marginal scrap pieces or strips 41. As best seen in FIG. 3, each of these pickers comprises a tubular member 44 slidably mounted upon a bolt 45, with the outer end portion of the bore of the tubular member 44 being slightly enlarged to slidingly accommodate the head of the bolt 45 and to form a shoulder at its inner end for cooperation with the head of the bolt to limit outward movement of the tubular member 44 relative to its bolt 45. The inner end of the bolt 45 is screwed into a suitable tapped aperture in a ring 46 secured in any suitable manner to the horizontal shaft 33. Intermediate its ends, the tubular picker member 44 is provided on its outer surface with a ring 47 secured in any suitable manner thereto, as by welding, to form a flange for engagement with the outer end of a light coil spring 48 surrounding the tubular member 44 and bolt 45 and engaging the ring 46 at its inner end. It thus will be seen that each of these tubular picker members 44 is mounted for rotation with the rotary cutter means 12 and for translational movement relative to the cutter members 36 and 42 on the bolts 45 which are mounted normal to the axis of rotation of the shaft 33. The spring means 48 normally maintains the associated tubular picker member 44 in its outermost position, as shown at the top of FIGS. 2 and 3, where it is prevented from further outward movement by the shoulder in the bore of the tubular member and the head of the bolt 45. During rotation of the cutter means 12, each of these pickers will have the outer end of its tubular member 44 embedded within the associated center scrap piece 43 or a portion of the marginal scrap strip 41 and its coil spring 48 will be compressed. Because the dough-engaging portion of the picker is tubular, it is preferred that the spring 48 be sufficiently light as not to force the outer end of the tubular member 44 completely through the dough sheet, as shown in connection with the lowermost picker illustrated in FIG. 3. The reason for this is so that when the scrap dough thus impaled thereon subsequently is removed from the picker, that portion of the dough disposed within the bore of the tubular member 44 will readily be withdrawn therefrom as an incident to the stripping of the outer portion of the scrap dough piece from the picker.

Also as best illustrated in FIG. 3, as each picker is rotated upwardly from its lowermost position, it will automatically remove the scrap piece of dough from the conveyor 14 into which it has been impressed, and the spring 48 will move the tubular member 44 outwardly to carry the scrap piece of dough thereon to an outwardly spaced position relative to the cutter members 36, 42. Stationary stripper means are provided in the form of a curved plate or member 49 for cooperation with the pickers to strip the scrap dough pieces therefrom and deliver the same to the auxiliary conveyor 13. The lower edge portion of this stripper plate 49 is secured in any suitable manner to the rearwardly disposed vertical wall of the trough 19, as best illustrated in FIG. 3. From that point, the stripper plate 49 curves upwardly and rearwardly (to the right in FIG. 3), terminating at its rear edge adjacent the upper peripheral portion of the rotary cutter means 12. The rear marginal edge portion of the plate 49 is provided with a plurality of slots 51 (FIG. 1), each aligned with certain of the tubular picker members 44 to provide clearance for movement of the latter therethrough, and which define fingers having their free ends extending between the periphery of the cutter members 36, 42 and the scrap pieces of dough 41 and 43 when the latter are in their outwardly spaced positions on the tubular picker members 44. These finger portions of the plate 49 defined by the slots 51 therein thus cooperate with the tubular picker members 44 in the manner illustrated in FIG. 3 to strip the scrap dough pieces 41, 43 therefrom as the pickers are rotated downwardly from their uppermost positions. The stripper plate 49 also functions to thereafter guide such stripped scrap dough pieces onto the upper run of the endless belt 31 of the auxiliary conveyor 13. By avoiding complete separation of the central portion of a scrap piece from the remainder thereof, which could result from a tubular member 44 cutting completely through the dough sheet, this stripping of the scrap dough from the picker results in such central portion of the dough piece readily automatically being removed from the bore of the tubular picker member 44. As will best be appreciated from FIG. 1, the endless belt 31 of the auxiliary conveyor 13 drops the scrap dough pieces so delivered thereto after such pieces have been carried laterally thereby beyond the makeup table and main conveyor belt 14 and as that portion of the auxiliary conveyor belt 31 supporting the same passes around the roller 29. Consequently, suitable scrap dough collection means (not shown) conveniently may be positioned below this delivery end of the belt 31 of the auxiliary conveyor 13.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. Dough cutter mechanism for rolling engagement with a sheet of dough, comprising a plurality of cutter elements, means for supporting said dough sheet, a second means for supporting said cutter elements for movement relative to said dough sheet to form a plurality of dough pieces and scrap pieces from said dough sheet, and picker members mounted on said second supporting means for movement relative thereto to embedding engage said scrap pieces and separate the same from said dough pieces.

2. Dough cutter mechanism for rolling engagement with a sheet of dough, comprising a plurality of cutter of elements, means for supporting said dough sheet, a second means for supporting said cutter elements for movement relative to said dough sheet to form a plurality of dough pieces and scrap pieces from said dough sheet, picker members mounted on said second supporting means for movement with said cutter elements to embeddingly engage said scrap pieces and separate the same from said dough pieces, and stripper means mounted on said second supporting means for removing said scrap pieces from said picker members.

3. Dough cutter mechanism, comprising a conveyor for imparting translation movement to a sheet of dough, a cutter mounted for rotational movement relative to said conveyor for forming a plurality of dough pieces and scrap pieces from said dough sheet, and a plurality of picker members mounted on said cutter for embeddingly engaging said scrap pieces and removing the same from said conveyor.

4. Dough cutter mechanism, comprising a conveyor for imparting translational movement to a sheet of dough, a cutter mounted for rotational movement relative to said conveyor for forming a plurality of dough pieces and scrap pieces from said dough sheet, a plurality of picker members mounted on said cutter for movement relative thereto and adapted to embeddingly engage said scrap pieces and separate the same from said dough pieces, and stationary stripper means for removing said scrap pieces from said picker members.

5. Dough cutter mechanism according to claim 4, including an auxiliary conveyor movable angularly relative to the direction of movement of said dough sheet, and said stripper means being mounted to deliver said scrap pieces from said picker members to said auxiliary conveyor.

6. In a dough cutter mechanism according to claim 5, means driven by said cutter for driving said auxiliary conveyor.

7. Dough cutter mechanism, comprising cutter means mounted for rotation on a horizontal axis and including peripheral cutter elements for forming dough pieces and scrap pieces from a sheet of dough, a belt conveyor having a horizontal run for carrying a sheet of dough past said cutter elements and cooperating therewith to rotate said cutter means, picker members mounted on said cutter means for rotation therewith embeddingly engage said scrap pieces, and means for imparting translational movement to said picker members normal to said axis relative to said cutter elements for assisting in the removal of the same from said conveyor run.

8. Dough cutter mechanism according to claim 7, wherein said last-recited means comprises spring means urging said picker members outwardly of said axis.

9. Dough cutter mechanism according to claim 8, wherein said picker members are tubular, means for limiting outward movement of said picker members caused by said spring means, the outer ends of said picker members normally extending radially of said axis beyond said cutter elements for engaging the dough sheet and thereby being displaced inwardly against the resistance of said spring means and embedded in said scrap pieces, and said spring means being sufficiently weak to cause said picker members to be slightly retracted and thereby prevent said outer ends of said picker members from being forced completely through said dough sheet.

10. In dough cutter mechanism according to claim 9, stationary stripper means extending above said cutter means and provided with slots for the passage of said picker members therethrough, whereby said scrap dough pieces are stripped from the outer ends of said picker members.

11. Dough cutter mechanism, comprising cutter means mounted for rotation on a horizontal axis and including peripheral cutter elements for forming dough pieces and scrap pieces from a sheet of dough, a belt conveyor having a horizontal run for carrying a sheet of dough past said cutter elements and cooperating therewith to rotate said cutter means, picker members mounted on said cutter means for rotation therewith and translational movement normal to said axis relative to said cutter elements for embeddingly engaging said scrap pieces and removing the same from said conveyor run, an auxiliary conveyor, and stripper means cooperating with said picker members for removing said scrap pieces therefrom and delivering the same to said auxiliary conveyor.

12. Dough cutter mechanism according to claim 11, wherein said auxiliary conveyor is driven by said cutter means.

13. Dough cutter mechanism according to claim 11, wherein said stripper means comprises a stationary sheet member having a lower edge disposed adjacent said auxiliary conveyor and an upper edge terminating adjacent the periphery of said cutter means with slots opening at said upper edge to receive and provide clearance for said picker members.

14. Dough cutter mechanism for cutting dough pieces for doughnuts from a sheet of dough with a minimum of scrap, comprising cutter means including a drum mounted for rotation on a horizontal axis, a plurality of equally spaced rows of first cutter elements mounted substantially circumferentially around the periphery of said drum, each cutter element of each row forming a point of juncture at each end thereof with an end of an adjacent cutter element to define an included angle of 120 degrees, a plurality of second cutter elements mounted on said drum parallel to said axis and joining each row of said first cutter elements to its adjacent row at every other point of juncture of adjacent first cutter elements to define an included angle of 120 degrees, whereby said first and second cutter elements define a plurality of hollow hexagonal cutters, the lateral edges of said hexagonal cutters forming sides of adjacent hexagonal cutters, and hollow cylindrical cutter members having axes normal to said axis of rotation and each centrally located with respect to a said hexagonal cutter whereby a cylindrical center piece is formed in each hexagonal dough piece formed by said hexagonal cutters, and central picker members mounted on said cutter means within said cylindrical cutter members and extending radially outwardly beyond said first and second cutter elements for rotation therewith about said horizontal axis and radial movement normal to said horizontal axis and relative to said first and second cutter elements, whereby said central picker members embeddingly engage said center pieces of said hexagonal dough pieces as said hexagonal dough pieces are formed and remove said center pieces from said hexagonal dough pieces.

15. In dough cutter mechanism according to claim 14, additional picker members similar to said central picker members and disposed laterally of the outermost rows of said first cutter elements for removing the remaining marginal edge portions of said sheet of dough.

16. Dough cutter mechanism according to claim 15, wherein said picker members comprise tubular members and spring means for moving the same to carry scrap dough pieces engaged thereby to an outwardly spaced position relative to said cutter elements and cutter members, and stationary stripper means having fingers with free ends extending outwardly of said cutter elements and inwardly of said scrap dough pieces when the latter are in such outwardly spaced position and adjacent said tubular members for cooperating with the latter to remove said scrap dough pieces therefrom.

References Cited in the file of this patent

UNITED STATES PATENTS

| | | |
|---|---|---|
| 17,262 | Chase | May 12, 1857 |
| 492,206 | Hunter et al. | Feb. 21, 1893 |
| 1,267,478 | Thomas | May 28, 1918 |
| 1,945,755 | Scruggs | Feb. 6, 1934 |
| 2,009,288 | Beckmann | July 23, 1935 |
| 2,010,442 | Sharkey | Aug. 6, 1935 |
| 2,049,515 | Potdevin | Aug. 4, 1936 |
| 2,095,631 | Cumfer | Oct. 12, 1937 |
| 2,158,053 | Bobst | May 16, 1939 |
| 2,445,831 | Hoffman | July 27, 1948 |
| 2,446,201 | Turner | Aug. 3, 1948 |
| 2,496,468 | Hanson | Feb. 7, 1950 |
| 2,523,178 | Zeprun | Sept. 19, 1950 |
| 2,525,987 | Williamson | Oct. 17, 1950 |

FOREIGN PATENTS

| | | |
|---|---|---|
| 745,990 | Great Britain | Mar. 7, 1956 |